United States Patent [19]

Wilhelm

[11] 4,380,060
[45] Apr. 12, 1983

[54] DEVICE FOR PUSH-PULL TRANSMISSION

[75] Inventor: Wilhelm Wilhelm, Munich, Fed. Rep. of Germany

[73] Assignee: Siemens Aktiengesellschaft, Berlin & Munich, Fed. Rep. of Germany

[21] Appl. No.: 190,235

[22] Filed: Sep. 24, 1980

[30] Foreign Application Priority Data

Sep. 27, 1979 [DE] Fed. Rep. of Germany ....... 2939252
Oct. 3, 1979 [DE] Fed. Rep. of Germany ....... 2940140

[51] Int. Cl.³ .............................................. H04J 15/00
[52] U.S. Cl. ........................................ 370/5; 370/119; 375/36
[58] Field of Search ....................... 370/5, 119, 6, 112; 375/36, 38; 178/63 R, 63 B, 63 C

[56] References Cited

U.S. PATENT DOCUMENTS

| 1,663,730 | 3/1928 | Ravut | 370/5 |
| 3,541,239 | 11/1970 | Reid | 375/36 |
| 3,671,671 | 6/1972 | Watanabe | 375/36 |
| 4,112,253 | 9/1978 | Wilhelm | 370/27 |
| 4,173,714 | 11/1979 | Bloch et al. | 370/5 |

Primary Examiner—Douglas W. Olms
Attorney, Agent, or Firm—Hill, Van Santen, Steadman, Chiara & Simpson

[57] ABSTRACT

The invention relates to a device for push-pull transmission of items of binary information, wherein in order to improve the ratio of the information which can be simultaneously transmitted to the number of lines in a line group comprising at least three lines, more than two different potentials are produced on the lines while maintaining a constant potential sum in the line groups. Two or more line groups can serve to form phantom circuits.

5 Claims, 16 Drawing Figures

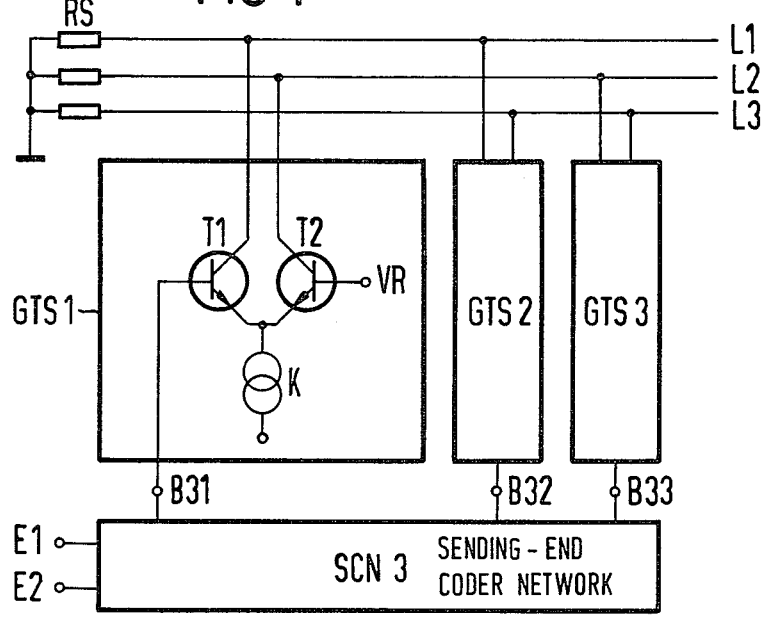
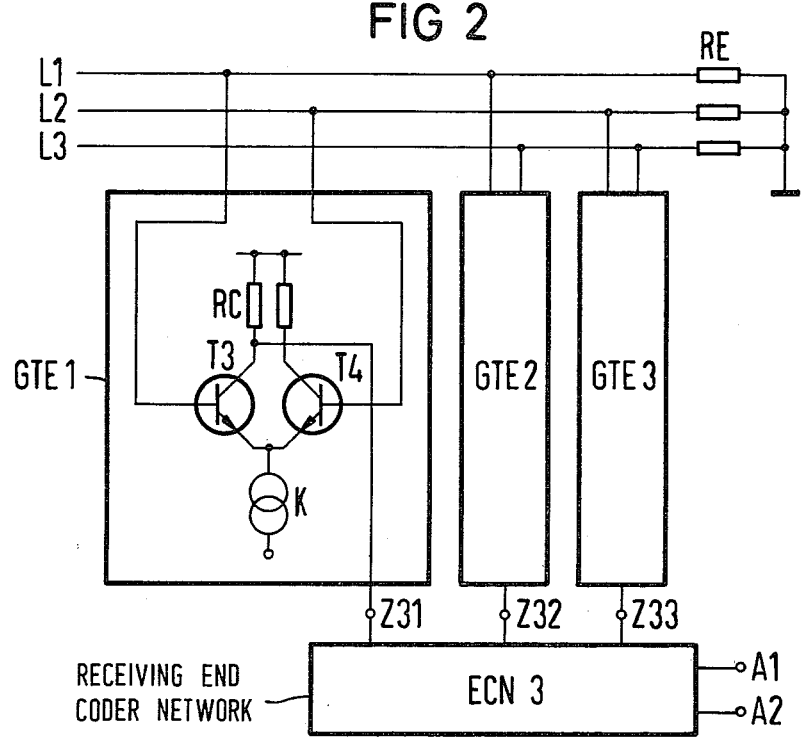

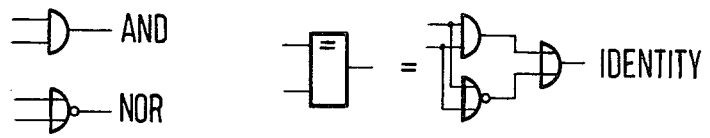
FIG 6
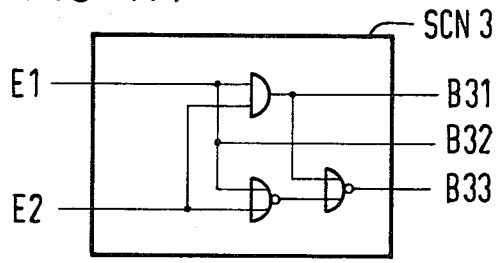
FIG 7A
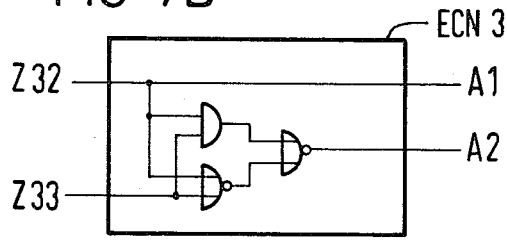
FIG 7B
FIG 8A
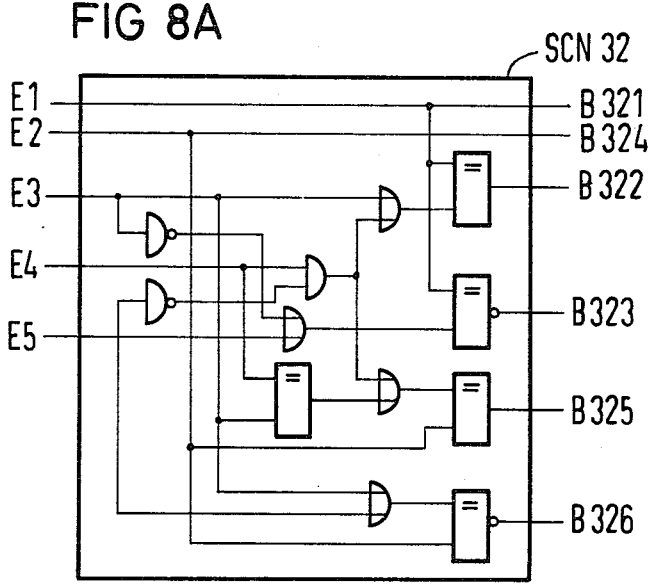

DEVICE FOR PUSH-PULL TRANSMISSION

BACKGROUND OF THE INVENTION

The invention relates to a device for push-pull transmission of an item of binary information across line groups having at least three or more lines. Push-pull transmitters and push-pull receivers are connected to these lines.

The push-pull principle is used with preference for transmitting data between two opposite stations in which equal ground potentials are not assured. A system for transmitting push-pull signals on a 2 wire line in full duplex operation is disclosed in U.S. Pat. No. 4,112,253, incorporated herein by reference. The transmission of push-pull signals on a double or 2 wire line at least largely suppresses push-push interferences since at the receiving end an analysis is only carried out on the potential difference between the two lines on the basis of the sign of which the information is formed.

The parallel transmission of a plurality of bits, for example between various units within a data processing system across a corresponding number of double or 2 wire lines, involves a considerable expense in terms of lines and line plugs, the unpleasant manifestation of which is a large space requirement and high costs.

It is generally known to form a so-called phantom circuit from two double lines and thus to improve the ratio of the information which can be simultaneously transmitted to the overall number of physical lines—in the following referred to as transmission capacity—from 0.5 bits to 0.75 bits.

SUMMARY OF THE INVENTION

An object of the invention is to further increase the transmission capacity in a device for push-pull transmission. This object is realized in a system according to the invention where at least one line group having $n \geq$ three lines is provided together with s push-pull transmitters and s push-pull receivers connected to the lines, a transmitting-encoder means for forming from k input signals to be transmitted $s=(n-1)$ n/2 control signals for the control of the s push-pull transmitters whose outputs are connected in s different combinations to the n lines where the number k of input signals is a maximum integer $<\log_2 (n!)$, and wherein inputs of the s push-pull receivers are connected to the n lines. A receiving-end coder means is provided for forming k output signals which are identical to the k input signals from s intermediate signals emitted from the s push-pull receivers.

BRIEF DESCRIPTION OF THE DRAWINGS

FIG. 1 illustrates the principle of a transmitting device for push-pull transmission of two bits across a three-wire line group;

FIG. 2 illustrates the receiving device which corresponds to the transmitting device shown in FIG. 1;

FIGS. 7A, through 10D are logic circuit diagrams for various implementations of the receiver end and transmitter end coder networks for the system of the invention and wherein FIG. 6 is a legend to identify various logic elements employed in the coder network circuit diagrams.

DESCRIPTION OF THE PREFERRED EMBODIMENTS

Figure 3:
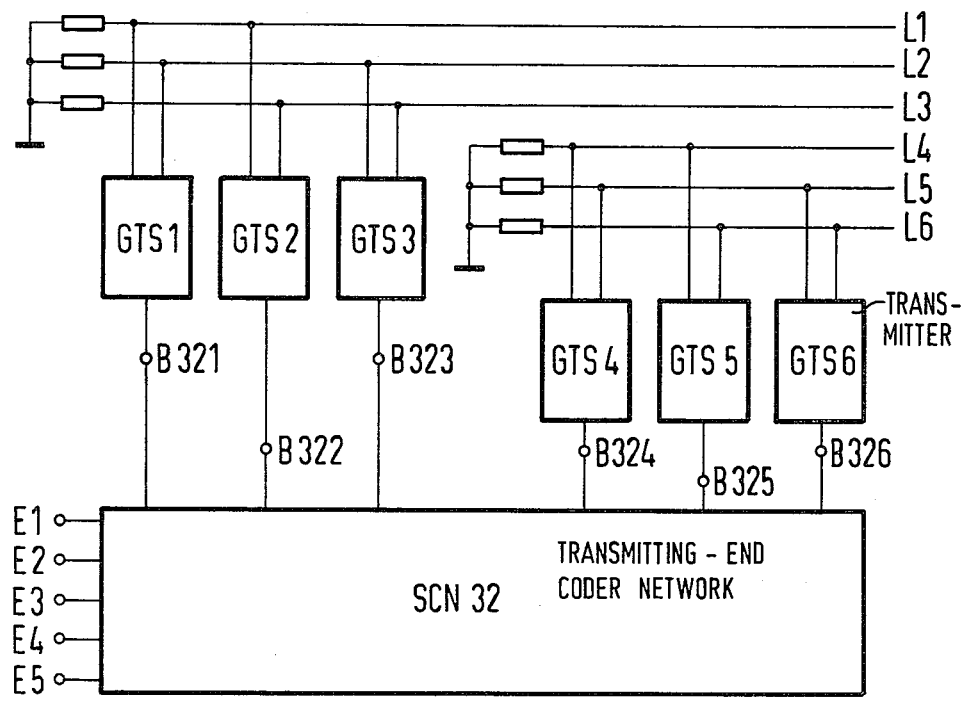
FIG. 3 illustrates a transmitting device for the transmission of 5 bits across two three-wire line groups.

If one considers push-pull transmission across a double line comprising the lines L1 and L2, it will become obvious that the line potentials must differ from one another in each logic state in order that they can be interrogated, free of ground potential, by means of a differential amplifier, and that the sum of the potentials is constant. If one of the potentials is arbitrarily designated zero, the values shown in Table 1 will apply.

The principle which forms the basis of push-pull transmission on a double line can be extended to a group of lines comprising $n>2$ lines. In the case of a line group where $n=3$ lines the values shown in Table 2 will apply.

Thus it is possible to transmit six different logic states and thus $\log_2 (6)$ bits where the symbol $\log_2$ signifies, in known manner, the logarithm to the base 2.

Table 3 illustrates a few important values in dependence upon the number n of lines in a line group.

FIG. 1 illustrates a transmitting device for push-pull transmission of two bits across three lines L1 to L3. The resistors RS, whose value corresponds to the characteristic impedance of the lines, form the working resistances for the individual transmitters GTS1 to GTS3 which are designed as push-pull amplifiers. As in the exemplary embodiments to be discussed further in the description, the individual transmitters are of identical construction and contain two transistors T1 and T2 whose emitters are combined and connected to a constant current source K. The base of one transistor T1 is connected to an intermediate (control) signal B31. The base of the other transistor T2 is connected to a fixed reference potential VR. The collectors of the two transistors T1 and T2 are connected to the lines L1 and L2 respectively.

The two other push-pull transmitters GTS2 and GTS3 are controlled in a similar manner by the transmitter intermediate signals B32 and B33. The collectors of the transistors of these individual transmitters are connected to the lines L1, L3 and L2, L3 respectively. This exhausts all possible combinations, and additional transpositions are not possible. For example it would not be possible to increase the transmission capacity by connecting a fourth individual transmitter. On the other hand polarity reversals can be effected as these merely correspond to an inversion of the relevant intermediate signal.

The list of the possible potentials on the lines L1 to L3 which corresponds to the six possible states and which has already been given in Table 2 has been shown again in Table 4 in the form of voltage units. Here the logic values of the intermediate signals B31 to B33 have been given.

The intermediate signals B31 to B33 are derived by a transmitting end coder network SCN3 (FIG. 1) from the input signals E1 and E2 which are to be transmitted. However as the input signals E1 and E2 can only assume four different logic states of the six different logic states arising from the possible potential distributions on the lines L1 to L3, any two thereof are superfluous. Preference will be given to those four potential distributions with respect to which recoding of the input signals E1 and E2 to the intermediate signals B31 to B33 can be effected most easily. An assignment of this kind can be seen from Table 4 if this is read row by row. This shows that in the event of the push-pull transmission of 2 bits across a three-wire line group, under the conditions which have been selected the transmitting end coder network is, so to speak, degenerated since, where B31=E1, B32=E1, and B33=E2, it exerts only a branching function of switch-through function. FIG. 2 illustrates the receiving device which is assigned to the transmitting device illustrated in FIG. 1 and which comprises the push-pull receivers GTE1 to GTE3 which are identical to one another. As illustrated in FIG. 2, in the example of the push-pull receiver GTE1 each receiver contains two transistors T3 and T4 whose coupled emitters serve to feed in a constant current from the source K. The base electrodes of the transistors are connected to the lines L1 and L2 which, like the line L3, are terminated by resistors RE corresponding to the characteristic impedance. A receiver end intermediate signal Z31 is obtained from the collector of the transistor T3 with a load resistance RC.

The connection of the inputs of the two other push-pull receivers GTE2 and GTE3 to the lines L1 to L3 is carried out in a manner similar to that of the connection of the outputs of the corresponding transmitters. The receivers GTE2 and GTE3 supply the further receiver end intermediate signals Z32 and Z33.

A receiver end coder network ECN3 serves to convert the intermediate signals Z31 to Z33 into the output signals A1 and A2 which are to be identical to the original input signals E1 and E2. In this example the receiving end coder network ECN3 also becomes extremely simple, as can easily be seen from Table 4, if the signals B31 to B33 and E1, E2 are replaced by the signals Z31 to Z33 and A1, A2 respectively. Here we have in fact A1=Z31 or A1=Z32 and A2=Z33. One of the two receivers GTE1 or GTE2 could thus be dispensed with.

The extremely simple method of deriving the transmitting end intermediate signals B31 to B33 from the input signals E1 and E2 on the one hand, and of deriving the output signals A1 and A2 from the receiving end intermediate signals Z31 to Z33 on the other hand does however involve the disadvantage that in the event of a change in only one input signal E1 or E2, the potentials on all three lines L1 to L3 are changed. This can give rise to the formation of so-called spikes at the receiving end. Table 5 illustrates one of several codes whereby, in the event of a change in only one input signal, potential changes occur only on two lines.

The transmitting end and receiving end coder networks SCN3 and ECN3 must now be designed in accordance with the following logic equations:

B31=E1·E2

B32=E1

B33=E1≠E2 and

A1=Z32

A2=Z32≠Z33

In this case the push-pull receiver GTE1 is superfluous.

Here, as in the following exemplary embodiments, the coder networks have been fully characterized by the quoted logic functions. The logic function symbols which have been used represent

+ OR

· AND

= logic identity

≠ EXOR.

As can be seen from Table 3, the computed value for the information which can be transmitted across a three-wire line group amounts to 2.585 bits. However in reality only two bits can be transmitted as can easily be seen and as also shown in the above described exemplary embodiment.

FIG. 7A shows one preferred embodiment for the transmitting coder network SCN3 and FIG. 7B a design for the receiving coder network ECN3. FIG. 6 is a legend for use in identifying the logic symbols for the coder network circuit diagrams.

On the other hand it is possible to transmit 5 bits across two line groups each comprising three lines if an appropriate design of the transmitting end coder network ensures that at least a part of the input signals E1 to E5 influence the potential distribution of the two line groups.

FIG. 3 illustrates the plan of a corresponding transmitting device. The receiving device is constructed in a similar fashion (see also FIG. 2). In order that the transmitting end intermediate signals B321 to B326 may be derived from the input signals E1 to E5, the transmitting end coder network SCN32 must fulfill the following logic equations:

B321=E1

B322=E1=(E3+E4·E5),

B323=E1≠(E3+E5)

B324=E2

B325=E2=(E3=E4+E4·E5)

B326=E2≠(E3+E5).

FIG. 8A shows one form of the transmitting coder network SCN32.

As regards the receiving end coder network ECN32 we then have

A1=Z321

A2=Z324

A3=(Z321=Z322)·(Z324≠Z326)

A4=(Z322≠Z325)=(Z321=Z324)

A5=(Z321≠Z323)·(Z324≠Z326).

Figure 8B:
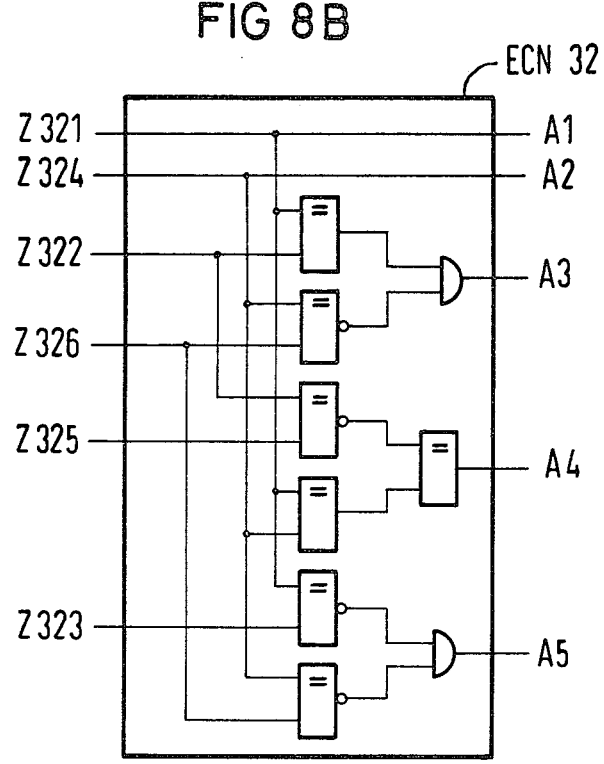

FIG. 8B shows one form of the receiving end coder ECN32.

Figure 4:
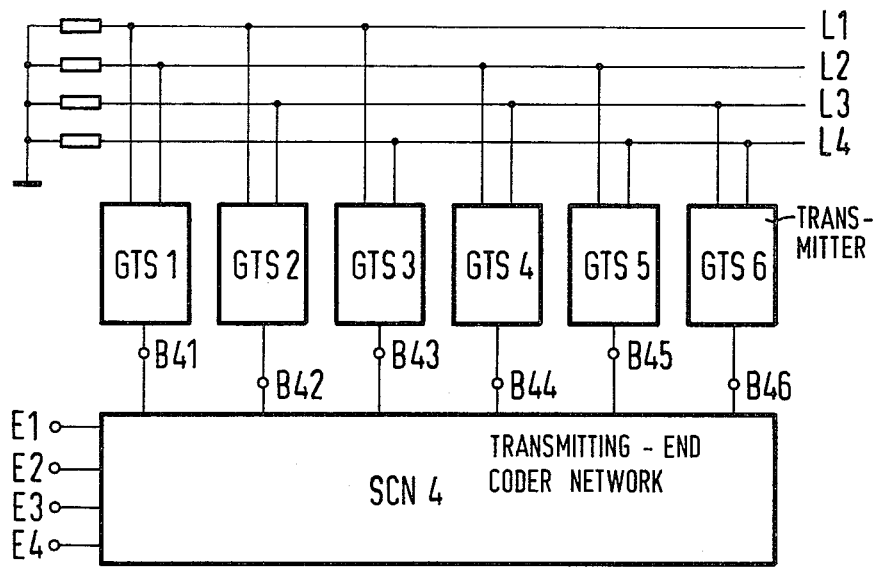
FIG. 4 illustrates a transmitting device for the transmission of 4 bits across a four-wire line group.

As a further exemplary embodiment FIG. 4 illustrates the simplified transmitting device comprising 6 push-pull transmitters GTS1 to GTS6 for the transmission of 4 bits across a line group comprising four lines L1 to L4. The connection of the receiver inputs to the lines L1 to L4 corresponds to the connection of the transmitter outputs. Since of the 24 possible combinations of transmitting end intermediate signals only 16 are required for the transmission of the four input signals, the possibility again exists of selecting the means of deriving the transmitting end intermediate signals B41 to B46 from the input signals E1 to E4 to be as simple as possible and to ensure that in the event of a change in only one input signal, the line potentials are changed on only two lines.

Table 6 illustrates an appropriate conversion of the input signals E1 to E4 into the transmitting end intermediate signals B41 to B46 and moreover into the line potentials on the lines L1 to L4. For this purpose it is necessary to use logic elements which fulfull the following logic functions in the transmitting end coder network SCN4:

$$B41 = (\overline{E1} + E2) \cdot (E2 + \overline{E3})$$

$$B42 = \overline{E1}$$

$$B43 = (\overline{E1} + \overline{E2}) \cdot (E2 + E3)$$

$$B44 = (\overline{E1} + \overline{E2}) \cdot (E3 + E4)$$

$$B45 = E3$$

$$B46 = E1 \cdot E4 + E3 \cdot \overline{E4}.$$

Figure 9A:
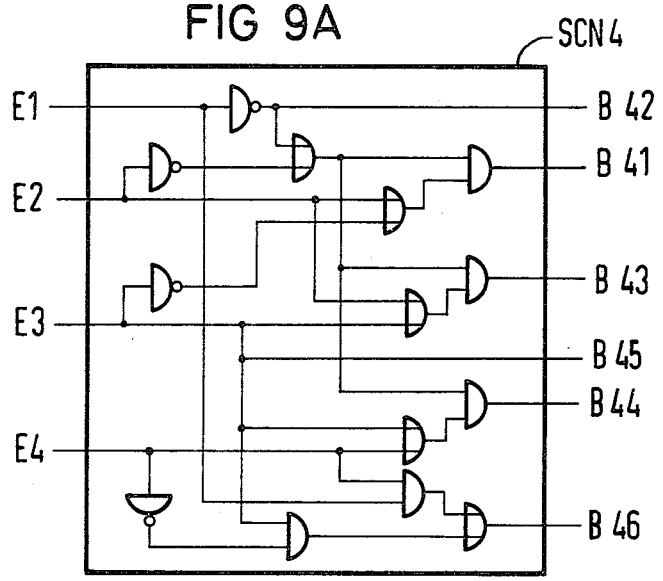

FIG. 9A shows one form of the transmitter coder SCN4.

Table 6 will apply to the receiving end if the transmitting end intermediate signals Z41 to Z46 and the input signals E1 to E4 are replaced by the output signals A1 to A4. For the conversion, the receiving end coder network ECN4 must execute the following logic functions:

$$A1 = \overline{Z42}$$

$$Z2 = Z41 \equiv Z43$$

$$A3 = Z45$$

$$A4 = Z44 \not\equiv Z46.$$

Figure 9B:
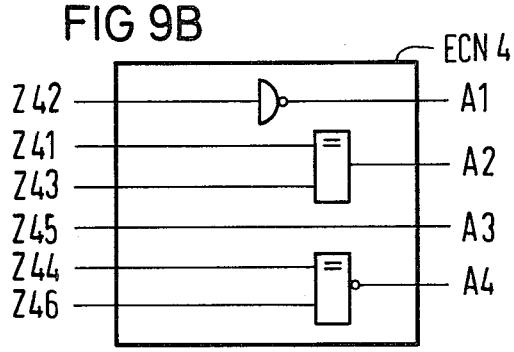

FIG. 9B shows one form of receiving decoder ECN4.

As the techniques in accordance with the invention ensure that the sum of the potentials within a line group and thus also the mean group potential remain constant, by combining a plurality of line groups it is possible to form phantom circuits. Thus, for example, in the exemplary embodiment illustrated in FIG. 3 it is possible to form a phantom circuit and thus to increase the overall transmission capacity from 5 bits to 6 bits.

In the case of more than two groups each composed of an equal number of physical lines, the same measures which have been described in the form of a few examples with respect to groups composed of more than two lines can be used for the phantom circuits. Table 7 illustrates a few characteristic values in dependence upon the total number n of the lines and the number m of the line groups employing phantom circuits. From the various possibilities of forming grouped line systems based on the values n and m, the line arrangement comprising three line groups each containing three lines may be singled out as it permits an electrically advantageous cabling technique in which the mutual couplings between the lines belonging to various groups balance one another even at relatively short line lengths ($\approx 0.1$ m). This produces a phantom characteristic impedance which is only slightly smaller in value than the characteristic impedance of the individual lines.

The overall transmission capacity of an arrangement of this kind amounts to 10 bits, since 4·2.585 bits = 10.34 bits where 2.585 bits as shown in table 3 is the theoretical value of the transmission capacity of a three-line group. This also results in a comparatively low number of line potentials as can also be seen from the aforementioned Table 7. The number of the line potentials is in fact $n + n/m - 1$, and for $m = \nu n$ becomes a minimum, where n and m have been assumed to be integers.

In this case however the formation of the intermediate signals for the transmitter group of the phantom circuits if assisted by input signals which in fact control the derivation of the intermediate signals for the transmitter groups of the individual line groups. The reverse conditions apply at the receiving end. Since, however, the transit times on the physical line circuits and on the phantom circuits differ somewhat from one another on account of the different characteristic impedances, false output signals can occur at the receiving end for the duration of the transit time differences.

This not particularly serious shortcoming can be avoided if the transmitting and receiving devices are designed to transmit 9 bits, thus abandoning the maximum transmission capacity. A bit group of this kind represents, as is known, an information unit which is frequently used in data technology in which 8 bits are normally interpreted as data bits and the ninth bit as a parity bit.

Figure 5:
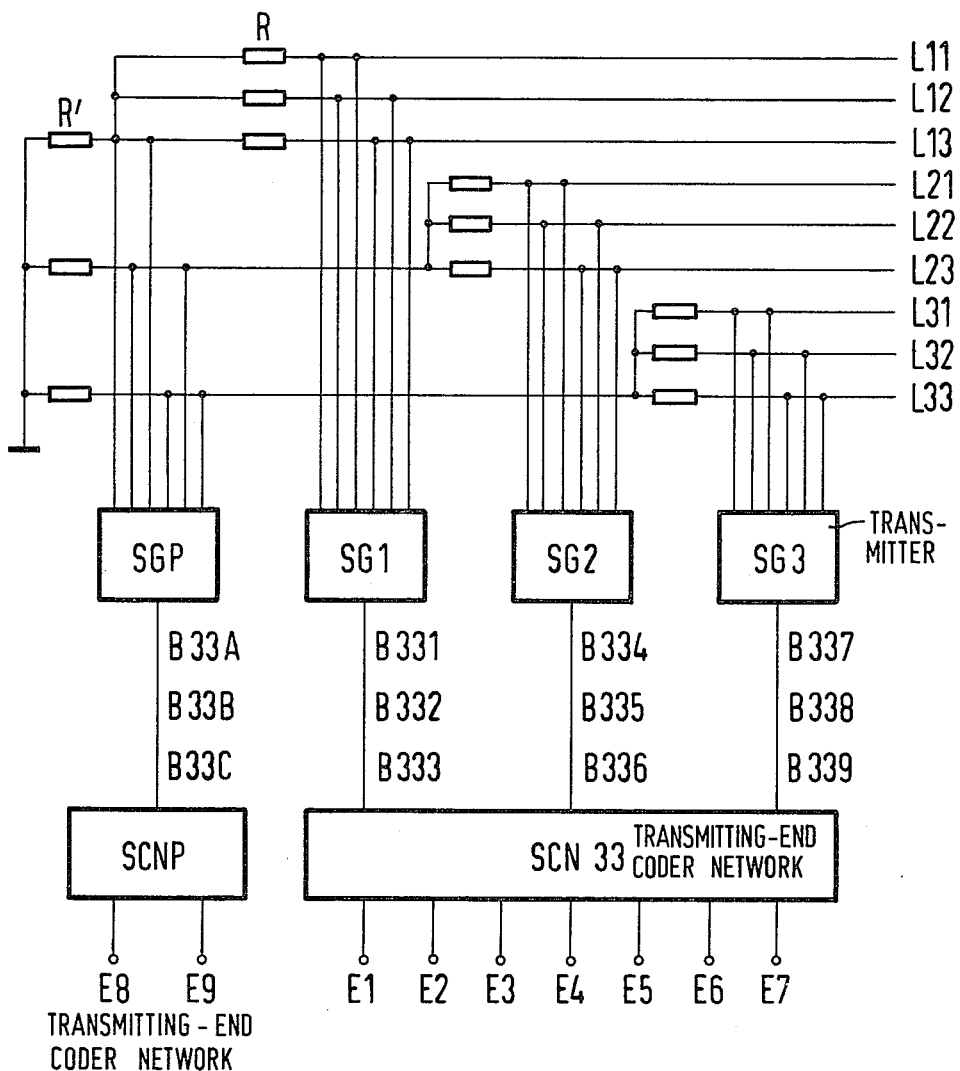
FIG. 5 illustrates a transmitting device for the transmission of 9 bits across three three-wire line groups using phantom circuits.

FIG. 5 schematically illustrates a corresponding transmitting device comprising the transmitter groups SG1 to SG3 and SGP which operate on the line groups L11 to L13, L21 to L23, and L31 to L33, and on the phantom circuits. The transmitting end intermediate signals B331 to B339 are derived from the input signals E1 to E7, and the intermediate signals B33A to B33C are derived from the input signals E8 and E9 by means of separate coder networks SCN33 and SCP. The lines are terminated by resistors R which are equal to the characteristic impedance of the individual lines, and the additional resistors R' are equal to the characteristic impedance of the three-line group. As regards the receiver groups which are directly connected to the lines, as in the case of the previously discussed exemplary embodiments, the receiving device is of similar design to the transmitting device and therefore need not be described in detail. One exception, which remains to be discussed, consists of the receiver group which is assigned to the phantom circuits.

The conversion of the input signals into the transmitting-end intermediate signals by means of the coder networks SCN33 and SCNP can be effected by means of the following logic equations:

$$B331 = E1$$

$$B332 = E1 \equiv E7$$

$$B333 = \overline{E1}$$

$$B334 = E2$$

$$B335 = E2 \equiv (\overline{E6} + E4 \cdot E5)$$

$$B336 = E2 \not\equiv (\overline{E5} + \overline{E4} \cdot E6)$$

$$B337 = E3$$

$$B338 = E3 \equiv (\overline{E4} + E5 \cdot \overline{E6})$$

$$B339 = E3 \not\equiv (E4 + E5 \cdot E6)$$

$$B33A = E8 \cdot E9$$

B33B=E8

B33C=E8≠E9.

Figure 10A:
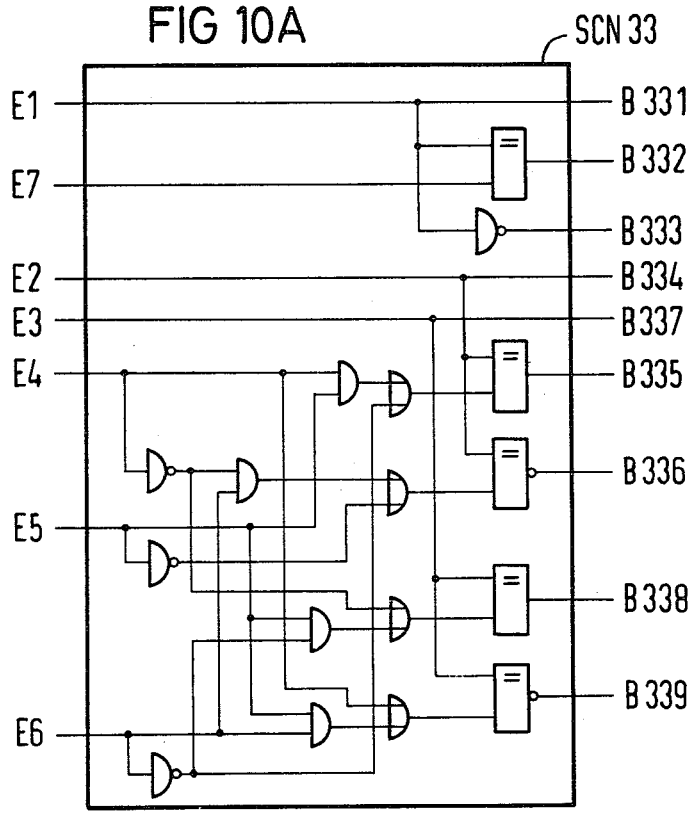
Figure 10B:
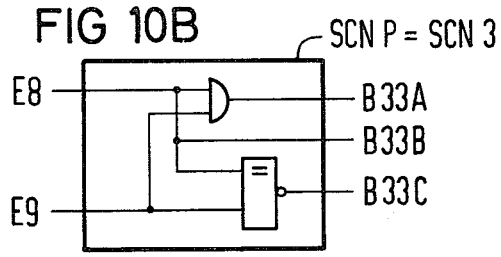

The transmitting end coders SCN33 and SCNP in one preferred form are shown in FIGS. 10A and 10B respectively.

The following recoding procedure must then be carried out at the receiving end for the receiving end coders ECN33 and SCNP:

A1=Z331

A2=Z334

A3=Z337

A4=(Z338≠Z337)+(Z339≠Z337)·(Z336≠Z334)

A5=$\overline{(Z336≠Z334)}$+$\overline{(Z338≠Z337)}$·(Z339≠Z337)

A6=(Z335≠Z334)+$\overline{(Z336≠Z334)}$·(Z338≠Z337)

A7=$\overline{Z332≠Z331}$

A8=Z33B

A9=Z33B≠Z33C).

Figure 10C:
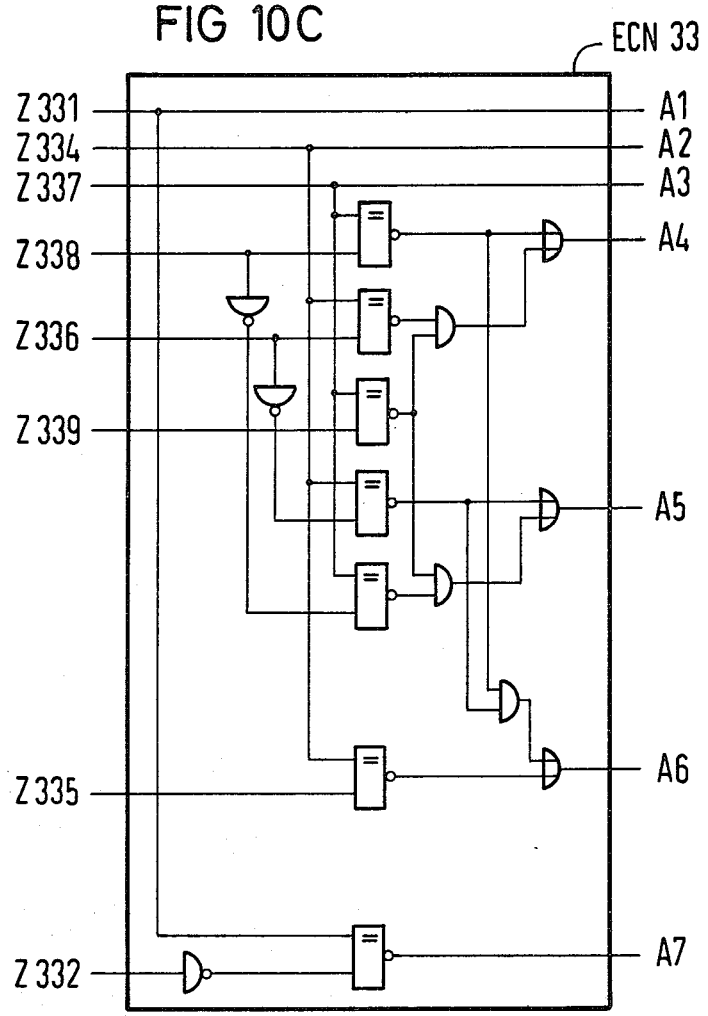
Figure 10D:
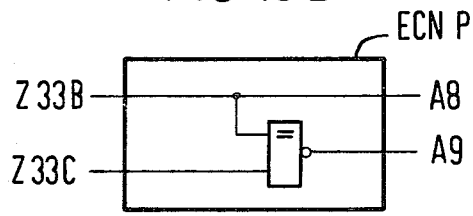

The receiving end coders ECN33 and SCNP in one preferred form are shown in FIGS. 10C and 10D respectively.

It will be clear from the above list that only two receiving end intermediate signals, namely Z33B and Z33C, are required for the derivation of the output signals A8 and A9. As a result, one push-pull receiver can be dispensed with in the receiver group assigned to the phantom circuits.

As in the case of the double line, in the line systems here under consideration it is possible to carry out a simultaneous bidirectional operation (duplex operation). A transmitting-receiving device suitable for this purpose which is to be connected to one pair of lines in all the combinations possible in the case of more than two lines (without repetition), is known, for example, from U.S. Pat. No. 4,112,253, incorporated herein by reference. However in duplex operation it should be noted that the number of line potentials with $2·(m+n/m-1)-1$ is virtually doubled in comparison to unidirectional transmission.

| List of References | |
|---|---|
| T1–T4 | transistor |
| K | constant current source |
| VR | reference potential |
| RC | collector resistance |
| RS, RE, R, R' | terminating resistance |
| L | line |
| GTS | push-pull transmitter |
| GTE | push-pull receiver |
| SCN | transmitting-end coder network |
| ECN | receiving-end coder network |
| E | input signal |
| A | output signal |
| B | transmitting-end intermediate signal |
| Z | receiving-end intermediate signal |
| SG1–SG3,SGP | group of transmitters |

TABLE 1

| | Potentials | | |
|---|---|---|---|
| Signal | L1 | L2 | Potential Sum |
| 0 | 0 | 1 | 1 |
| 1 | 1 | 0 | 1 |

TABLE 2

| Potentials | | | |
|---|---|---|---|
| L1 | L2 | L3 | Potential Sum |
| 0 | 1 | 2 | 3 |
| 0 | 2 | 1 | 3 |
| 1 | 2 | 0 | 3 |
| 1 | 0 | 2 | 3 |
| 2 | 0 | 1 | 3 |
| 2 | 1 | 0 | 3 |

TABLE 3

| Lines | Potentials | Potential Sum | Information Bit | Information/Line Bit |
|---|---|---|---|---|
| 2 | 2 | 1 | 1 | 0.5 |
| 3 | 3 | 3 | 2.585 | 0.86 |
| 4 | 4 | 6 | 4.585 | 1.14 |
| 5 | 5 | 10 | 6.907 | 1.39 |
| 6 | 6 | 15 | 9.492 | 1.58 |
| n | n | (n−1)n/2 | log$_2$(n!) | [log$_2$(n!)]/n |

TABLE 4

| E1 | E2 | B31 | B32 | B33 | L1 | L2 | L3 |
|---|---|---|---|---|---|---|---|
| 1 | 1 | 1 | 1 | 1 | 2 | 1 | 0 |
| 1 | 0 | 1 | 1 | 0 | 2 | 0 | 1 |
|  |  | 1 | 0 | 0 | 1 | 2 | 0 |
|  |  | 0 | 1 | 1 | 1 | 0 | 2 |
| 0 | 1 | 0 | 0 | 1 | 0 | 2 | 1 |
| 0 | 0 | 0 | 0 | 0 | 0 | 1 | 2 |

TABLE 6

| E1 | E2 | E3 | E4 | B41 | B42 | B43 | B44 | B45 | B46 | L1 | L2 | L3 | L4 |
|---|---|---|---|---|---|---|---|---|---|---|---|---|---|
| 0 | 0 | 0 | 0 | 1 | 1 | 0 | 0 | 0 | 0 | 2 | 0 | 1 | 3 |
| 0 | 0 | 0 | 1 | 1 | 1 | 0 | 1 | 0 | 0 | 2 | 1 | 0 | 3 |
| 0 | 0 | 1 | 0 | 0 | 1 | 1 | 1 | 1 | 1 | 2 | 3 | 1 | 0 |
| 0 | 0 | 1 | 1 | 0 | 1 | 1 | 1 | 1 | 0 | 2 | 3 | 0 | 1 |
| 0 | 1 | 0 | 0 | 1 | 1 | 1 | 0 | 0 | 0 | 3 | 0 | 1 | 2 |
| 0 | 1 | 0 | 1 | 1 | 1 | 1 | 1 | 0 | 0 | 3 | 1 | 0 | 2 |
| 0 | 1 | 1 | 0 | 1 | 1 | 1 | 1 | 1 | 1 | 3 | 2 | 1 | 0 |
| 0 | 1 | 1 | 1 | 1 | 1 | 1 | 1 | 1 | 1 | 3 | 2 | 0 | 1 |
| 1 | 0 | 0 | 0 | 1 | 0 | 0 | 0 | 0 | 0 | 1 | 0 | 2 | 3 |
| 1 | 0 | 0 | 1 | 1 | 0 | 0 | 0 | 0 | 1 | 1 | 0 | 3 | 2 |
| 1 | 0 | 1 | 0 | 0 | 0 | 1 | 1 | 1 | 1 | 1 | 3 | 2 | 0 |
| 1 | 0 | 1 | 1 | 0 | 0 | 0 | 1 | 1 | 1 | 1 | 2 | 3 | 0 |
| 1 | 1 | 0 | 0 | 1 | 0 | 0 | 0 | 0 | 0 | 0 | 1 | 2 | 3 |
| 1 | 1 | 0 | 1 | 0 | 0 | 0 | 0 | 0 | 1 | 0 | 1 | 3 | 2 |
| 1 | 1 | 1 | 0 | 0 | 0 | 0 | 1 | 1 | 1 | 0 | 3 | 2 | 1 |

TABLE 6-continued

| E1 | E2 | E3 | E4 | B41 | B42 | B43 | B44 | B45 | B46 | L1 | L2 | L3 | L4 |
|---|---|---|---|---|---|---|---|---|---|---|---|---|---|
| 1 | 1 | 1 | 1 | 0 | 0 | 0 | 0 | 1 | 1 | 0 | 2 | 3 | 1 |

TABLE 5

| E1 | E2 | B31 | B32 | B33 | L1 | L2 | L3 |
|---|---|---|---|---|---|---|---|
|   |   | 1 | 1 | 1 | 2 | 1 | 0 |
| 1 | 1 | 1 | 1 | 0 | 2 | 0 | 1 |
|   |   | 1 | 0 | 0 | 1 | 2 | 0 |
| 1 | 0 | 0 | 1 | 1 | 1 | 0 | 2 |
| 0 | 1 | 0 | 0 | 1 | 0 | 2 | 1 |
| 0 | 0 | 0 | 0 | 0 | 0 | 1 | 2 |

TABLE 7

| Lines | Group | Lines/Group | Potentials | Character Set | Information | Information/Line |
|---|---|---|---|---|---|---|
| 4 | 1 | 4 | 4 | 24 | 4.585 | 1.146 |
| 4 | 2 | 2 | 3 | 8 | 3. | 0.750 |
| 6 | 1 | 6 | 6 | 120 | 9.492 | 1.585 |
| 6 | 2 | 3 | 4 | 72 | 6.170 | 1.028 |
| 6 | 3 | 2 | 4 | 48 | 5.585 | 0.931 |
| 8 | 1 | 8 | 8 | 40320 | 15.299 | 1.912 |
| 8 | 2 | 4 | 5 | 1152 | 10.170 | 1.271 |
| 8 | 4 | 2 | 5 | 384 | 8.580 | 1.073 |
| 9 | 1 | 9 | 9 | 362880 | 18.469 | 2.052 |
| 9 | 3 | 3 | 5 | 1296 | 10.339 | 1.148 |
| n | m | n/m | m + n/m − 1 | z | $\log_2(z)$ | $[\log_2(z)]/n$ |

$z = [(n/m)!]^m \cdot m!$

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A system for push-pull transmission of an item of binary information, comprising: at least one line group having $n \geq 3$ lines; s push-pull transmitters and s push-pull receivers connected to the lines; a transmitting-end coder means for forming from k input signals to be transmitted $s = (n-1)n/2$ intermediate control signals for the control of the s push-pull transmitters whose outputs are connected in s different combinations to the n lines, where the number k of input signals is a maximum integer $< \log_2 (n!)$; inputs of the s push-pull receivers being connected to the n lines; and a receiving-end coder means for forming k output signals which are identical to the k input signals from s intermediate signals emitted from the s push-pull receivers.

2. A system as claimed in claim 1 wherein the total number n of the lines are divided into m of said line groups each comprising n/m lines and that each group is assigned $t = (n/m - 1)n/2$ m push-pull transmitters and push-pull receivers which can be controlled by a corresponding number of control signals and which supply a corresponding number of intermediate signals.

3. A system as claimed in claim 2 wherein the m groups serve to form phantom circuits which are controlled in the same way as the lines of a group.

4. A system as claimed in claim 2 wherein the m groups serve to form phantom circuits, and wherein said input signals and said transmitting and coder means are provided such that the input signals assist formation of intermediate control signals by said transmitting and coder means for the transmitter group of the phantom circuits, said input signals controlling derivation of said intermediate control signals for the transmitter groups of the individual line groups.

5. A system as claimed in claim 3 wherein the control of the phantom circuits takes place independently of the control of the lines of a group.

* * * * *